United States Patent
Nakazato (10) Patent No.: US 9,826,218 B2
(45) Date of Patent: Nov. 21, 2017

(54) INFORMATION PROCESSING APPARATUS AND INFORMATION PROCESSING METHOD

(71) Applicant: CANON KABUSHIKI KAISHA, Tokyo (JP)

(72) Inventor: Yusuke Nakazato, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 906 days.

(21) Appl. No.: 14/231,186

(22) Filed: Mar. 31, 2014

(65) Prior Publication Data
US 2014/0293009 A1 Oct. 2, 2014

(30) Foreign Application Priority Data
Apr. 1, 2013 (JP) .................................. 2013-076449

(51) Int. Cl.
*H04N 13/02* (2006.01)
*G01B 11/26* (2006.01)
*G01B 11/25* (2006.01)

(52) U.S. Cl.
CPC ......... *H04N 13/0253* (2013.01); *G01B 11/25* (2013.01); *G01B 11/26* (2013.01)

(58) Field of Classification Search
CPC ........ G06F 3/017; G06F 3/0425; G06F 3/011; G06F 3/0304; G01B 11/25; G01B 11/26; G01B 11/24
USPC .......................... 348/46; 356/0.01, 10; 701/28
See application file for complete search history.

(56) References Cited

U.S. PATENT DOCUMENTS

| | | | |
|---|---|---|---|
| 7,248,344 B2* | 7/2007 | Morcom | G01S 7/487 356/10 |
| 9,082,185 B2 | 7/2015 | Sonoda | |
| 9,418,291 B2 | 8/2016 | Sonoda et al. | |
| 2009/0125175 A1* | 5/2009 | Park | G05D 1/024 701/28 |
| 2012/0268567 A1 | 10/2012 | Nakazato et al. | |

(Continued)

FOREIGN PATENT DOCUMENTS

| | | |
|---|---|---|
| JP | 2011128117 A | 6/2011 |
| JP | 2011175477 A | 9/2011 |
| JP | 2011185872 A | 9/2011 |

OTHER PUBLICATIONS

S. Inokuchi, K. Sato, F. Matsuda, "Range Imaging System for 3-D Object Recognition", International Conference on Pattern Recognition, pp. 78-119, 1984 with partial English translation.

(Continued)

*Primary Examiner* — Gims Philippe
(74) *Attorney, Agent, or Firm* — Rossi, Kimms & McDowell LLP (57) ABSTRACT

An image representing reflected light of structured light is acquired, distance information is calculated, from the image, and a measurement line map storing the distance information is generated. The structured light forms a plurality of measurement lines at discrete positions, and the measurement line map is formed as a two-dimensional array in which one dimension includes elements in a number corresponding to a number of the measurement lines, and another dimension includes elements in a number corresponding to a number of pixels of the image in a lengthwise direction of the measurement lines.

16 Claims, 5 Drawing Sheets

(56) References Cited

U.S. PATENT DOCUMENTS

2013/0148102 A1* 6/2013 Oggier ................ G01C 3/08
356/5.01
2014/0267623 A1* 9/2014 Bridges ............... G01S 17/003
348/46

OTHER PUBLICATIONS

Hironobu Fukai, Gang Xu, "Robust and Fast 3D Object Recognition and Tracking Using Exhaustive Search", The 14th Meeting Image Recognition and Understanding, pp. 1303-1310, 2011 with partial English translation.

Tateno Keisuke, Kotake Daisuke, Uchiyama Shinji, "A Model Fitting Method Using Intensity and Range Images for Bin-Picking Applications", IEICE Transactions on Information and Systems, vol. J94-D, No. 8, pp. 1410-1422, 2011 with partial English translation.

Takayuki Okatani, "Bundle Adjustment", IPSJ Transactions on Computer Vision and Image Media, vol. 2009-CVIM-167, No. 37, pp. 1-16, 2009 with partial English translation.

Rioux. "Laser range finder based on synchronized scanners." Applied Optics. Nov. 1, 1984:3837-3844. vol. 23, No. 21.

Johnson et al. "Using Spin Images for Efficient Object Recognition in Cluttered 3D Scenes." IEEE Transactions on Pattern Analysis and Machine Intelligence. May 1999:433-449. vol. 21, No. 5.

Besl et al. "A method for registration of 3-D shapes." IEEE Transactions on Pattern Analysis and Machine Intelligence. Feb. 1992:239-256. vol. 14, No. 2.

Tsai. "An Efficient and Accurate Camera Calibration Technique for 3D Machine Vision." Proceedings of IEEE Conference on Computer Vision and Pattern Recognition. 1986:364-374.

Arun et al. "Least-Squares Fitting of Two 3-D Point Sets." IEEE Transactions on Pattern Analysis and Machine Intelligence. Sep. 1987:698-700. vol. PAMI-9, No. 5.

* cited by examiner

INFORMATION PROCESSING APPARATUS AND INFORMATION PROCESSING METHOD

BACKGROUND OF THE INVENTION

Field of the Invention

The present invention relates to information processing for measuring the shape or the position and orientation of an object in a three-dimensional space.

Description of the Related Art

Distance measurement apparatuses for measuring distance information have been proposed to measure the shape or the position and orientation of an object in a three-dimensional space. In particular, as a noncontact distance measurement apparatus, a method of measuring distance information to a measurement target object by analyzing reflected light of light that has irradiated the object is often used. For example, there is known a method of capturing, by a camera, an object on which structured light is projected and calculating distance information from the light source position, the camera position, and the pattern position on the captured image based on triangulation, such as a slit light projecting method or a space encoding method.

In many cases, the calculated distance information is handled as a range image (measured data as distance information) having the same resolution as that of the captured image or the same resolution as that of the pattern of the structured light.

When the resolution of the range image is the same as that of the captured image, the density of measurement lines on a dimension almost perpendicular to the measurement lines (an axis almost perpendicular to the measurement lines) of the structured light out of two dimensions that constitute the coordinate plane of the range image is lower than the resolution of the captured image on the corresponding dimension. Hence, the range image includes many immeasurable areas where the distance information is not calculated, and the storage capacity may be wasted to hold such range images.

Additionally, when the resolution of the range image is assumed to be the same as that of the pattern of the structured light, the resolution of the range image can be lowered, in other words, the storage capacity can be reduced. When the structured light is projected using, for example, a projector, in general, the resolution of the pattern of the structured light is lower than that of the captured image on both of the two dimensions. Hence, in the range image having the same resolution as that of the pattern of the structured light, many pieces of distance information which should be calculated are missed.

SUMMARY OF THE INVENTION

In one aspect, an information processing apparatus comprising: an acquisition unit configured to acquire an image representing reflected light of structured light; and a generation unit configured to calculate distance information from the image and generate a measurement line map storing the distance information, wherein the structured light forms a plurality of measurement lines at discrete positions, and the measurement line map is formed as a two-dimensional array in which one dimension includes elements in a number corresponding to a number of the measurement lines, and another dimension includes elements in a number corresponding to a number of pixels of the image in a lengthwise direction of the measurement lines.

According to the aspect, it is possible to efficiently hold distance information acquired from an image obtained by capturing reflected light of structured light while preventing the distance information from being missed.

Further features of the present invention will become apparent from the following description of exemplary embodiments with reference to the attached drawings.

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

First Embodiment

In the first embodiment, a method of linearly measuring distance information of a measurement or detection target object (to be referred to as a "target object" hereinafter) existing in a three-dimensional space using a distance measurement function and holding the distance information in a format (measurement line map) corresponding to the measurement density will be described. Additionally, a method of detecting the presence/absence of a target object by collating distance information referred to from a measurement line map with the shape information of the target object will be described.

[Arrangement of Apparatus]

Figure 2:
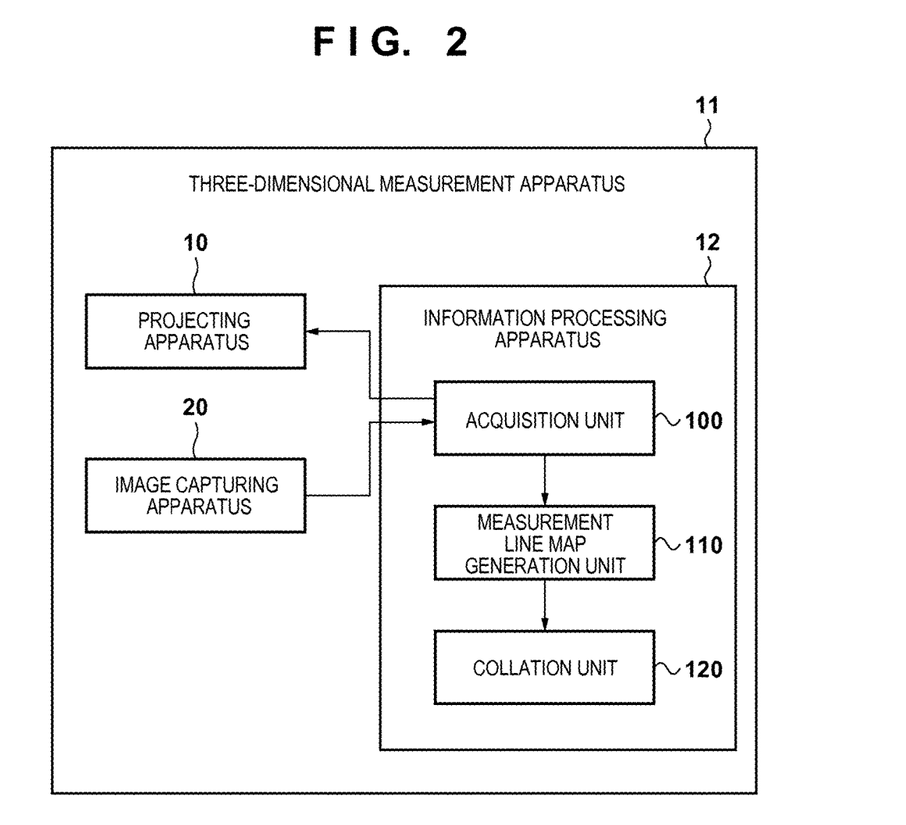
FIG. 2 is a block diagram showing the arrangement of a three-dimensional measurement apparatus according to an embodiment.

FIG. 2 shows the arrangement of a three-dimensional measurement apparatus according to this embodiment. As shown in FIG. 2, a three-dimensional measuring apparatus 11 has an arrangement in which a projecting apparatus 10 for projecting structured light and an image capturing apparatus 20 for capturing reflected light of the structured light are connected to an information processing apparatus 12. For example, a projector can be used as the projecting apparatus 10, and a camera can be used as the image capturing apparatus 20.

An acquisition unit 100 of the information processing apparatus 12 acquires an image obtained by capturing a three-dimensional space (capturing range) where a target object should exist by controlling the projecting apparatus 10 and the image capturing apparatus 20 to calculate distance information. More specifically, the acquisition unit 100 acquires an image obtained by causing the projecting apparatus 10 to project, structured light and causing the image capturing apparatus 20 to capture reflected light of the structured light.

A measurement line map generation unit 110 generates and holds a measurement line map that describes the distance information measured from at least one image acquired by the acquisition unit 100 or reference information to the distance information. A collation unit 120 collates the distance information referred to from the measurement line map with the shape information of the target object, and derives the target object or detects the presence/absence of the target object.

[Measurement Processing]

Figure 3:
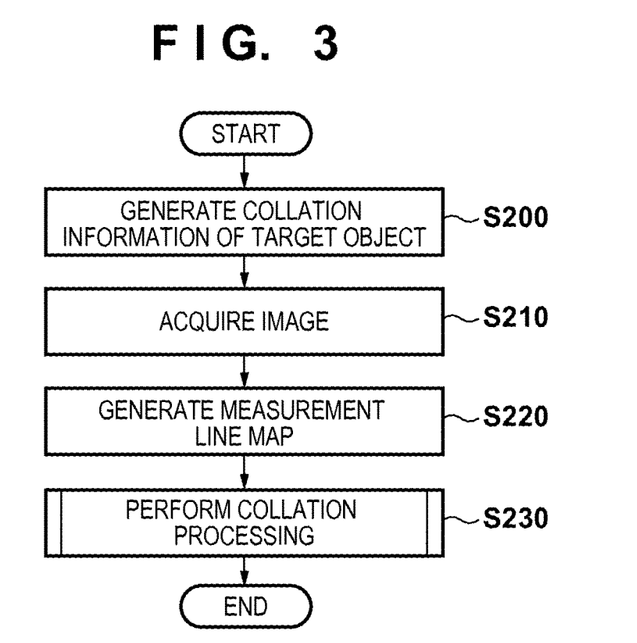
FIG. 3 is a flowchart showing three-dimensional measurement processing according to the embodiment.

FIG. 3 is a flowchart of measurement processing of the three-dimensional measurement apparatus according to this embodiment.

The collation unit 120 performs initialization processing, generates collation information of a target object, and holds the collation information in a memory (not shown) (S200). Alternatively, collation information generated in advance may be read out from a storage device (not shown). The collation information is a recognition dictionary, and details thereof will be described later.

The acquisition unit 100 projects structured light to a three-dimensional space (capturing range) where a target object should exist, and acquires an image obtained by capturing reflected light of the structured light (S210). Note that, a captured image acquired in advance may be read out from a storage device (not shown).

The measurement line map generation unit 110 acquires distance information (the three-dimensional coordinate values of measurement points) of a scene from the image acquired in step S210, and generates and holds a measurement line map that stores distance information of each measurement point in each element of a two-dimensional array (S220).

The collation unit 120 performs collation processing of outputting a result of determining the presence/absence of a target object based on the collation information and the distance information represented by the measurement line map generated in step S220 (S230).

[Measurement Line Map Generation Processing (S220)]

Figure 1A:
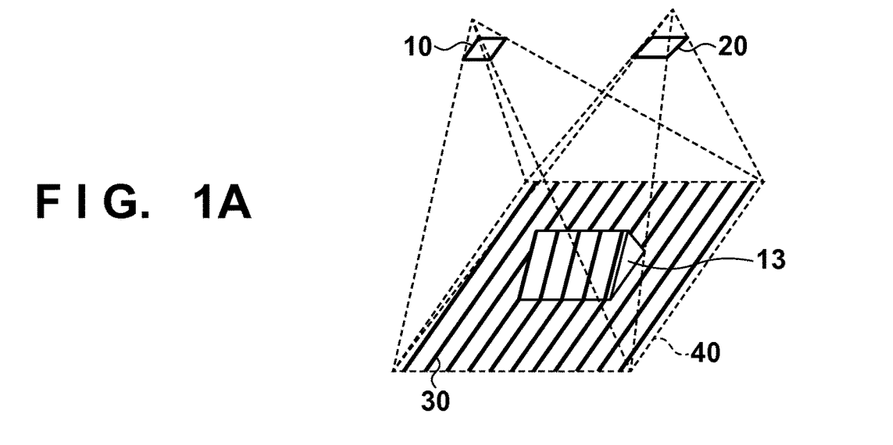
FIGS. 1A to 1C are views showing the state of distance measurement and the outlines of a range image and a measurement line map.

Measurement line map generation processing in step S220 will be described with reference to the measurement conceptual views of FIGS. 1A to 1C. Note that the measurement conceptual views illustrate a case in which a target object 13 exists in a three-dimensional space.

First, the distance information of the target object 13 is calculated based on triangulation from a result obtained by capturing reflected light of projected light on the target object 13. As shown in FIG. 1A, the projecting apparatus 10 projects structured light capable of forming a plurality of measurement lines 30 which are almost perpendicular to a line connecting the projecting apparatus 10 and the image capturing apparatus 20 and are located at discrete positions. When the image capturing apparatus 20 captures reflected light from the target object 13 and the like as a two-dimensional image, distance information on the measurement lines 30 is calculated from the captured image by triangulation.

In this embodiment, distance information is calculated using a slit light projecting method described in literature 1 below. In the slit light projecting method, a slit light projecting direction is discretely moved, and an image corresponding to each slit light projecting direction is captured. The reflection position of the slit light is detected from each captured image, and distance information is calculated by triangulation from the position of the projecting apparatus 10, the position of the image capturing apparatus 20, and the detected slit light reflection positions.

Literature 1: Marc Rioux, "Laser range finder based on synchronized scanners", Applied Optics, Vol. 23, No. 21, pp. 3837-3844, 1984

The distance information calculation method is not limited to the slit light projecting method, and any method is usable as long as linear distance information can be acquired. For example, the projecting apparatus 10 may combine a laser light source or a linear light-emitting diode (LED) with a mirror and a lens, or sandwiches a slit-shaped slide between a light source and a lens. The image capturing apparatus 20 need only be able to capture the reflected light of structured light and can therefore be a camera, as described above, or a photodiode such as a PSD (Position Sensitive Detector).

To calculate distance information, a space encoding method of projecting a plurality of gray code patterns (see literature 2), a grid pattern projecting method of projecting a grid pattern (see literature 3), a multi-slit light projecting method using an additional reference line pattern (see literature 4), and the like are also usable.

Literature 2: S. Inokuchi, K. Sato, F. Matsuda, "Range imaging system for 3-D object recognition", International Conference on Pattern Recognition, pp. 806-808, 1984

Literature 3: Japanese Patent Application No. 2009-289614

Literature 4: Japanese Patent Application No. 2010-053669

In the above-described way, the measurement line map generation unit 110 acquires linearly measured distance information. The measurement line map generation unit 110 acquires distance information in a number corresponding to the number of image capturing pixels of the image capturing apparatus 20 for each measurement line. Hence, the measurement line map has a two-dimensional array on a two-dimensional coordinate space that is the projection plane of the projecting apparatus 10 in which one dimension corresponds to the number of measurement lines, whereas the other dimension corresponds to the number of pixels in the lengthwise direction of the measurement lines in the captured image of the image capturing apparatus 20.

Figure 1B:
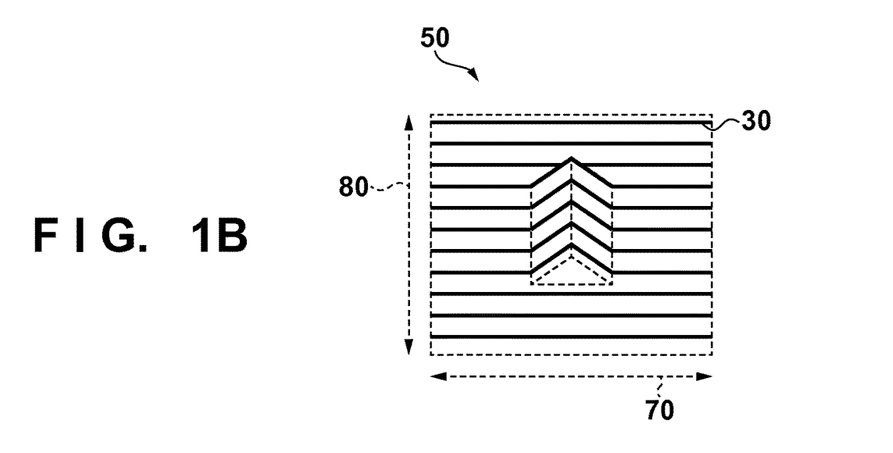

FIG. 1B illustrates a range image 50 obtained by measuring only black areas. The measurement line map generation unit 110 generates a measurement line map 60 shown in FIG. 1C from the range image 50. At this time, the measurement line map 60 in which a height direction 80 of the range image 50 (the column direction of the two-dimensional array) is associated with the number of measurement lines indicated by reference numeral 90 in FIG. 1C, and a widthwise direction 70 of the range image 50 (the row direction of the two-dimensional array) is associated with the number of pixels of the image capturing apparatus 20 is generated. More specifically, the measurement line map 60 in which pieces of distance information as many as the measurement lines are arrayed in the column direction, and pieces of distance information as many as the pixels of the image capturing apparatus 20 are arrayed in the row direction is obtained by storing, for each measurement line 30, distance information as many as the pixels corresponding to the image width of the image capturing apparatus 20 sequentially in the measurement line map 60.

Figure 1C:
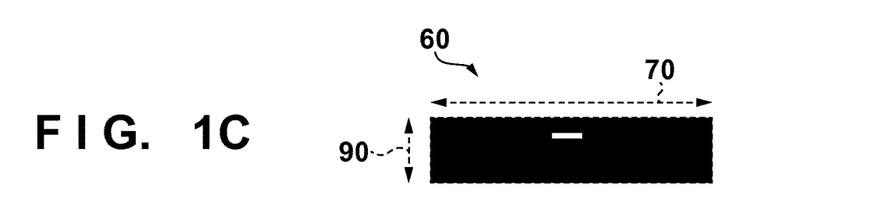

However, the two-dimensional array constituting the measurement, line map 60 is not limited to the example shown in FIG. 1C, and any form is usable as long as information about a distance can be referred to from the two-dimensional array. For example, the rows may replace the columns, or a two-dimensional array formed from a partial area of a two-dimensional array in which the column corresponds to the number of measurement lines, and the row corresponds to the number of pixels of the image capturing apparatus 20 may be used. Each element of the two-dimensional array stores distance information and the three-dimensional coordinate values of the measurement point of the distance information. However, the present invention is not limited to this example, and it is necessary to only store information about a distance in each element of the two-dimensional array. For example, a distance from the projecting apparatus 10 or the image capturing apparatus 20, or a pointer to distance information may be stored. Additional information such as the measurement reliability of each measurement point may be included as well as the information about the distance.

[Collation Processing (S230)]

Collation processing in step S230, that is processing of collating distance information referred to from the measurement line map generated by the measurement line map generation unit 110 with the shape information of the target object and detecting (recognizing) the target object will be described next with reference to the flowchart of FIG. 4.

The collation unit 120 extracts geometric features by referring to distance information from the measurement line map generated in step S220 (S2010), compares the extracted geometric features with geometric features held by a recognition dictionary created in advance, and associates geometric features having close feature amounts with each other (S2020). The recognition dictionary holds the geometric features of the target object. The recognition dictionary may also hold additional information such as the positions and orientations of the geometric features and directions in which the geometric features can be observed.

Based on determination of whether geometric features associated with the geometric features held by the recognition dictionary are extracted, the collation unit 120 outputs a target object detection result (S2030). More specifically, when geometric features associated with the geometric features held by the recognition dictionary are extracted, the collation unit 120 outputs a determination result representing detection of the target object. If geometric features associated with the geometric features held by the recognition dictionary are not extracted, the collation unit 120 outputs a determination result representing non-detection of the target object. In other words, the presence/absence of target object detection is output. Additionally, two-dimensional coordinate values on the measurement line map of the target object or on the captured image, three-dimensional coordinate values or orientations in the three-dimensional space may be output from the coordinate values of the associated geometric features.

Collation Processing Using Spin Images

The collation unit 120 uses a recognition method using spin images (see literature 5).

Literature 5: A. E. Johnson and M. Hebert, "Using Spin Images for Efficient Object Recognition in Cluttered 3D Scenes", IEEE Transactions on Pattern Analysis and Machine Intelligence, vol. 21, No. 5, pp. 433-449, 1999

An example in which recognition processing using spin images is executed in the collation processing (S230) will be described below. When executing recognition processing using spin images, the geometric model of the target object and spin image feature amounts calculated from distance measurement data in advance are held in the recognition dictionary in initialization processing (S200).

The collation unit 120 searches for a measurement point (to be referred to as a "neighboring point" hereinafter) located in the neighborhood of a measurement point of interest (to be referred to as a point of interest hereinafter) by referring to the measurement line map, and calculates a spin image feature as a geometric feature (S2010). A spin image is formed from a histogram that represents the positional relationship between a point of interest and a three-dimensional point (neighboring point) located in the neighborhood of the point of interest by a direction $\alpha$ perpendicular to a normal and a normal direction $\beta$ and is formed from the number of points concerning the two directions. It is therefore necessary to extract, as a neighboring point, a three-dimensional point existing within a predetermined distance range from the point of interest. When a measurement point stored in an element of a two-dimensional array that is a measurement line map is defined as a point of interest, one of elements located in the neighborhood of the element, which stores a measurement point whose three-dimensional distance from the point of interest falls within a predetermined range is extracted. A spin image feature amount is calculated from the three-dimensional coordinate values of the measurement point, of the extracted element.

When the spin image feature amounts are applied, if a range image having the same resolution as that of the captured image is used, elements in the neighborhood of the element storing the point of interest are often empty, and the number of elements to be searched for is large. However, when the measurement line map of this embodiment is used, the search range can be narrow. It is therefore possible to speed up the search of neighboring elements and calculate geometric feature amounts in a short time.

The collation unit 120 associates the spin image feature amounts calculated in step S2010 with the spin image feature amounts held by the recognition dictionary by collating them (S2020), and outputs the presence/absence of target object detection based on the association result (S2030). At this time, the position and orientation of the target object may be calculated by minimizing the distance between the associated feature amounts.

The collation processing according to this embodiment is not limited to the above-described method, and any method is usable as long as it calculates a feature amount representing a local feature of a range image or a three-dimensional point group by referring to a local area of the measurement line map, and detects the presence/absence of the target object by collating the feature amounts with the feature amounts registered in the recognition dictionary in advance. For example, the geometric feature detected in step S2010 and collated in step S2020 is not limited to a spin image feature amount. It may be a curvature in a local area or a two-dimensional image feature amount calculated while regarding a distance value as a luminance value. Alternatively, when extracting geometric features in step S2010, a conversion function of accessing from the coordinate values of a captured image to distance information (distance value or three-dimensional coordinates) may be prepared, and feature amounts may be extracted from a local area on a captured image. As the conversion function, for example, a conversion table or conversion formula for converting coordinate values on the captured image into coordinate values on the measurement line map is usable.

It is also possible to recognize the orientation of the target object. For example, when creating the recognition dictionary, the target object is observed from a plurality of directions. Information that, associates the target object observation directions with the distribution of geometric features is stored in the recognition dictionary. The recognition dictionary is searched for a geometric feature distribution most similar to the distribution of the extracted or calculated geometric features. The orientation of the target object is recognized based on the observation direction corresponding to the detected geometric feature distribution.

An example in which three-dimensional feature amounts are used as the geometric features has been described. However, two-dimensional feature amounts may be used. For example, a method of performing collation using a set of classification trees created from a local image while regarding a distance value referred to from the measurement line map as a luminance value is usable (see literature 6).
Literature 6: P. J. Besl and N. D. McKay, "A method for registration of 3-D shapes", IEEE Transactions on Pattern Analysis and Machine Intelligence, vol. 14, No. 2, pp. 239-256, 1992

Note that an example has been described above in which measurement line map creation and collation processing are performed by the three-dimensional measurement apparatus. However, an apparatus for creating a measurement line map and an apparatus for performing collation processing may be constituted as separate apparatuses.

As described above, distance information of a target object obtained from a result of capturing reflected light of structured light on the target object can be held in a format (measurement line map) according to the measurement density. This makes it possible to handle measurement data in a format according to the density of measurable distance information, reduce waste of the storage capacity when storing range images, and prevent measurable information from being missed.

The target object is defected based on spin image feature amounts using the measurement line map. This makes it possible to narrow the search range of neighboring points of a point of interest and quickly calculate feature amounts using the point of interest and the neighboring points thereof.

Second Embodiment

The second embodiment of the present invention will be described below. In the second embodiment, a method of collating distance information referred to from a measurement line map with shape information representing the three-dimensional shape of a target object and calculating the position and orientation of the target object will be described. The arrangement of a three-dimensional measurement apparatus according to the second embodiment is the same as in the first embodiment, and a description thereof will be omitted.

A collation unit 120 according to the second embodiment uses a method of calculating the position and orientation of a target object by model fitting (see literature 7).
Literature 7: Japanese Patent Application No. 2010-039201

Measurement processing of the three-dimensional measurement apparatus according to the second embodiment is the same as in the first embodiment and complies with the flowchart of FIG. 3 except for the initialization contents of initialization processing (S200) and details of collation processing (S230). Note that image acquisition processing (S210) and measurement line map generation processing (S220) are the same as in the first embodiment.

In initialization processing (S200), the collation unit 120 acquires the geometric model of a target object from, for example, another apparatus as collation information, and acquires the internal parameters (angle of view, resolution, focal length, and the like) of the measurement apparatus (projecting apparatus 10 and image capturing apparatus 20) for acquiring distance information.

[Collation Processing (S230)]

Collation processing (S230) according to the second embodiment will be described with reference to the flowchart of FIG. 5.

The collation unit 120 performs coarse position and orientation setting processing (S3010). More specifically, the collation unit 120 recognizes a target object by referring to distance information from a measurement line map generated in step S220, acquires the coarse position and orientation of the target object, and sets them as the position and orientation of the target object. The coarse position and orientation of the target object are the position and orientation of the target object calculated at such an accuracy that allows the values to be used as the initial values for model fitting. That is, the position and orientation of the target object are set using the collation processing (steps S2010 to S2030 of FIG. 4) according to the first embodiment.

However, the method of calculating the coarse position and orientation of the target object is not limited to this example, and any method is applicable as long as it calculates the coarse position and orientation of the target object using knowledge such as the shape or appearance of the target object. For example, the coarse position and orientation may be calculated by causing the user to input a measurement point and a corresponding point of the geometric model and minimizing the distance between them. Alternatively, the parameter space with six degrees of freedom for the position and orientation to be calculated may be discretized at a predetermined interval, and a position and orientation that minimize the distance between the geometric model surface and the distance measurement, data may be searched for from the discretized position and orientation parameters (see literature 8).
Literature 8: Hironobu Fukai, Gang Xu, "Robust and Fast 3D Object Recognition and Tracking Using Exhaustive Search", The 14th Meeting Image Recognition and Understanding, pp. 1303-1330, 2011

Next, the collation unit 120 associates measurement points with the geometric features of the geometric model of the target object using the set coarse position and orientation by referring to the measurement line map generated in step S220 (S3020). As the geometric features of the geometric model, three-dimensional points sampled from the surface of the geometric model are used. However, the geometric features of the geometric model can be any geometric features representing the shape of the target object. For example, feature points such as spin image features, the vertices of the geometric model, planes such as triangular patches, or curved surfaces expressed by implicit polynomial functions or B spline functions may be used.

The collation unit 120 projects geometric features of the geometric model of the target object, which are observable in a state in which the target object exists in the coarse position and orientation, onto the measurement line map, and associates the geometric features with measurement points referred to from the measurement line map based on overlap of projection positions. Whether a geometric feature is observable is determined by performing observation simulations using the internal parameters of the projecting apparatus 10 and the image capturing apparatus 20 and the coarse position and orientation. Alternatively, observation simulations from a plurality of viewpoints may be conducted in advance information representing the range of observable orientations may be added to each geometric feature, and association may be done for geometric features for which the coarse position and orientation fall within the range of observable orientations.

In the second embodiment, the internal parameters (angle of view, resolution, focal length, and the like) of the projecting apparatus 10 and the image capturing apparatus 20 are assumed to be known. The internal parameters are acquired by the initialization processing (S200). Then, the geometric features of the geometric model are projected onto the measurement line map using an ideal projection plane whose distortion is corrected in accordance with an optical model using the acquired internal parameters, and association is performed. Note that for details of distortion correction, see, for example, a camera model described in literature 9.

Literature 9: Roger Y. Tsai, "An Efficient, and Accurate Camera Calibration Technique for 3D Machine Vision", Proceedings of IEEE Conference on Computer Vision and Pattern Recognition, pp. 364-374, 1986

Association Method

An association method will be described below in detail.

Let f1 and f2 be the focal lengths of the projecting apparatus 10 and the image capturing apparatus 20, respectively. Perspective projection conversion from the three-dimensional coordinate values (x, y, z) of a geometric feature of the geometric model to coordinate values (u1, v1) on the projection plane (two-dimensional plane) of the projecting apparatus 10 complies with $$(u1,v1)^T = (f1 \cdot x/z, f1 \cdot y/z)^T \quad (1)$$

Perspective projection conversion from the three-dimensional coordinate values (x, y, z) of a geometric feature of the geometric model to coordinate values (u2, v2) on the projection plane (two-dimensional plane) of the image capturing apparatus 20 complies with $$(u2,v2)^T = (f \cdot x/z, f2 \cdot y/z)^T \quad (2)$$

In a measurement line map 60 shown in FIG. 1C, let u be an axis corresponding to the number of measurement lines indicated by reference numeral 90, and v be an axis corresponding to the width of a captured image indicated by reference numeral 70. Perspective projection conversion from the three-dimensional coordinate values (x, y, z) of a geometric feature to coordinate values (u, v) on the measurement line map 60 can be performed by $$(u,v)^T = (u, v2)^T \quad (3)$$

Geometric features which are observable in a state in which the geometric model exists in the coarse position and orientation are projected onto the measurement line map 60 using equation (3). Distance information of a measurement, point corresponding to the projected coordinate values (u, v) is referred to from the measurement line map 60, and the geometric feature of the geometric model and the distance information of the measurement point are associated.

The association method is not limited to the above-described example, and any method is applicable if it can associate distance information with a geometric feature of the target object by referring to the measurement line map 60. For example, when coordinate values projected on the measurement line map 60 indicate an immeasurable area, a measurement point that can be associated may be searched for from adjacent elements of the measurement line map 60. Association may be done by extracting feature amounts such as spin images described in the first embodiment. Alternatively, association may be done by referring to a three-dimensional point group as distance information from the measurement line map 60 and searching for a measurement point closest to a geometric feature of the target object.

Position and Orientation Calculation Processing

Next, the collation unit 120 performs position and orientation calculation processing (S3030). The collation unit 120 minimizes an evaluation function based on the distances between the measurement points and the geometric features associated in step S3020. To apply the measurement points of distance information to the geometric model, the updating amount of the position and orientation of the target object is calculated and corrected by an iterative operation, thereby updating the position and orientation (see literature 10). For the iterative operation, a Gauss-Newton method is used as a nonlinear optimization method (see literature 11).

Literature 10: P. J. Besl, N. D. McKay, "A method for registration of 3-D shapes", IEEE Transactions on Pattern Analysis and Machine Intelligence, vol. 14, No. 2, pp. 239-256, 1992

Literature 11: Tateno Keisuke, Kotake Daisuke, Uchiyama Shinji, "A Model Fitting Method Using Intensity and Range Images for Bin-Picking Applications", IEICE Transactions on Information and Systems, Vol. J94-D, No. 8, pp. 1410-1422, 2011.

Note that as the nonlinear optimization method, any method other that the Gauss-Newton method is usable if it can calculate a position and orientation that Minimize the evaluation function. For example, a Levenberg-Marquardt method for more robust calculation may be used, or a simpler steepest descent method may be used. Another nonlinear optimization calculation method such as a conjugate gradient method or an incomplete Cholesky factorization conjugate gradient method (ICCG) may be used. For example, the distance between corresponding points itself can be used as an evaluation function. If normal information is added to a three-dimensional point that is a geometric feature of the geometric model, the three-dimensional point may be regarded as a small plane, and the distance between the plane and a measurement point may be used as an evaluation function. When a geometric feature of the geometric model is a plane or a curved surface, the distance between the plane or curved surface and a measurement point may be used as an evaluation function.

Next, the collation unit 120 determines convergence (S3040). If the updating amount of the position and orientation converges to a predetermined value, the collation processing ends. If the updating amount of the position and orientation does not converge, the processes of steps S3020 and S3030 are repeated. Note that the index used for convergence determination is not limited to the updating amount of the position and orientation, and it may be an evaluation value based on the distance between a measurement point and the geometric model, or the repetition count or elapsed time of processing.

Note that an example in which the position and orientation of the target object are calculated by the iterative operation has been described above. However, the position and orientation may be calculated by a direct method. For example, feature amounts such as spin images may be associated in step S3020, and the position and orientation of the image capturing apparatus 20 which minimize the distance between the three-dimensional coordinate values of corresponding feature points may be obtained by singular value decomposition (see literature 12).

Literature 12: K. S. Arun, T. S. Huang, S. D. Blostein, "Least-squares fitting of two 3-D point sets", IEEE Transactions on Pattern Analysis and Machine Intelligence, Vol. 9, No. 5, pp. 698-700, 1987

When a table or function of a distance field representing the distribution of distances from the surface of the geometric model is created in advance, association in step S3020 can be omitted. More specifically, the distance from a three-dimensional point group, which is distance information referred to from the measurement line map, may be calculated by referring to a distance field table or using a distance field function, and the position and orientation of the target object may be calculated by minimizing an evaluation function based on the distance.

In the above-described way, the position and orientation of the target object are calculated using the measurement line map and the geometric model of the target object. In this case, when association is performed by projecting the geometric features of the geometric model onto a range image 50 as shown in FIG. 1B, a number of cases occur where the geometric features are projected in unmeasurable areas (write areas in FIG. 1B). In such cases, it is necessary to determine that no association is found, or search for a measurement point in the neighborhood of the projection point on the range image 50 and perform association. If no association is found, position and orientation calculation may fail, or the position and orientation estimation accuracy lowers. In addition, searching for a measurement point in the neighborhood of the projection point takes long time. When association is done by projecting the geometric features of the geometric model onto the measurement line map shown in FIG. 1C, the geometric features are never projected in unmeasurable areas. It is therefore possible to prevent a failure of position and orientation calculation, a decrease in the position and orientation estimation accuracy, and an increase in the search time.

When the position and orientation of the target object are calculated using the measurement line map and the geometric model of the target object in the above-described way, the measurement points and the geometric features of the geometric model of the target object can be associated more efficiently and accurately.

Third Embodiment

The third embodiment of the present invention will be described below. In the third embodiment, a method of collating distance information (to be referred to as "measurement data B" or "current distance information B" hereinafter) referred to from a measurement line map with distance information (to be referred to as "measurement data A" or "past distance information A" hereinafter) obtained by measuring a target object in the past and aligning the measurement data B and the measurement data A will be described. The distance information is a set of three-dimensional coordinate values of measurement points where pieces of distance information are measured, as in the first, embodiment. However, the distance information need only be information about a distance and can be a set of distances from the measurement apparatus to measurement points.

The arrangement of a three-dimensional measurement apparatus according to the third embodiment is the same as in the first embodiment, and a description thereof will be omitted.

A collation unit 120 according to the third embodiment refers to a measurement line map and aligns the current distance information B and the past distance information A. In other words, the relative position and orientation between the current distance information B and the past distance information A are calculated, and a change in the position and orientation of a target object is calculated. Measurement processing of the three-dimensional measurement apparatus according to the third embodiment is the same as in the first embodiment and complies with the flowchart of FIG. 3 except for details of the processes of steps S200 to S230.

In initialization processing (S200), a collation unit 120 acquires a range image 50 (corresponding to the past distance information A) measured in advance from, for example, another apparatus as collation information. Note that the past distance information A may be measured using a measurement apparatus (projecting apparatus 10 and image capturing apparatus 20) for acquiring the current distance information B. In step S200, the collation unit 120 further acquires the internal parameters (angle of view, resolution, focal length, and the like) of the measurement apparatus (projecting apparatus 10 and image capturing apparatus 20) for acquiring distance information.

The collation unit 120 generates a measurement line map A from the range image 50 corresponding to the past distance information A (S220), and generates a measurement line map B from the range image 50 corresponding to the current distance information B (S210, S220), as in the first embodiment.

[Collation Processing (S230)]

Figure 5:
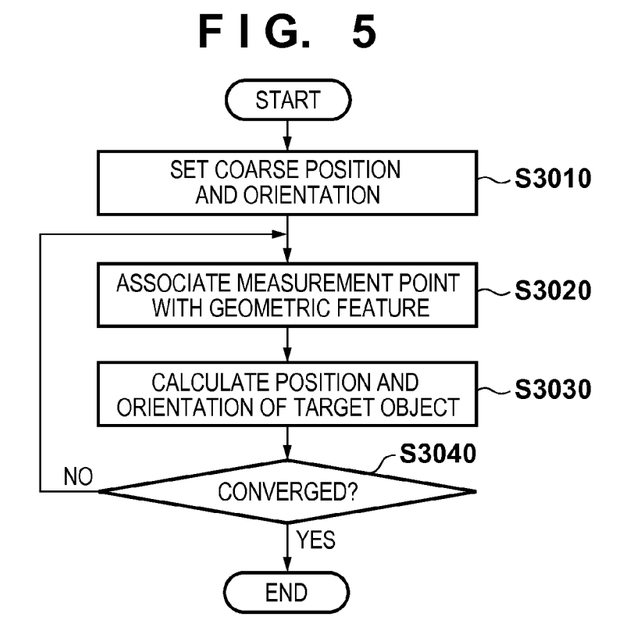
FIG. 5 is a flowchart showing collation processing according to the second embodiment.

Collation processing (S230) according to the third embodiment is almost the same as the procedure shown in FIG. 5 of the second embodiment except for details of each process. Collation processing (S230) according to the third embodiment will be described with reference to the flowchart of FIG. 7.

Figure 7:
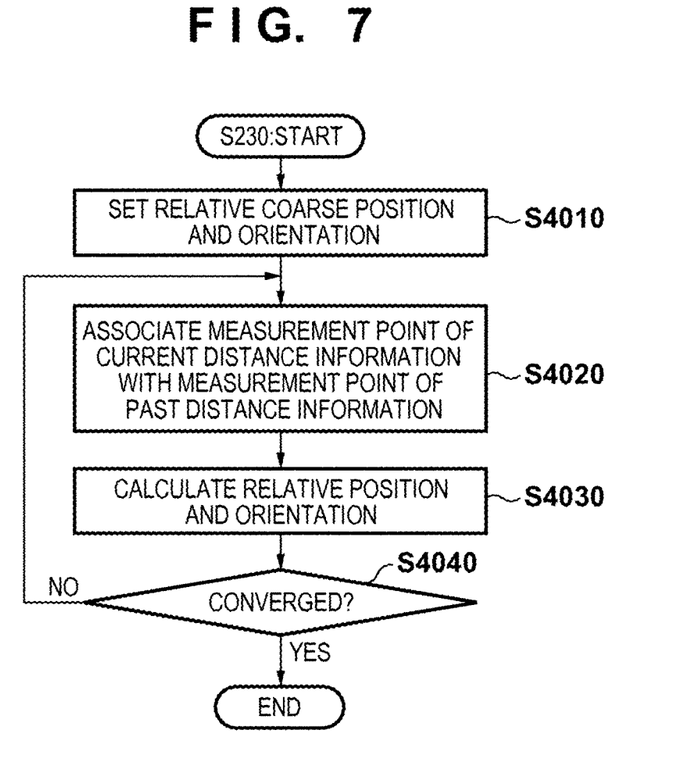
FIG. 7 is a flowchart showing collation processing according to the third embodiment.

The collation unit 120 performs coarse position and orientation setting processing (S4010). More specifically, the relative coarse position and orientation between the past distance information A and the current distance information B are set based on the measurement line maps A and B generated in step S220. The relative coarse position and orientation are the coarse position and orientation of the current distance information B with respect to the past distance information A or the coarse position and orientation of the past distance information A with respect to the current distance information B.

Figure 4:
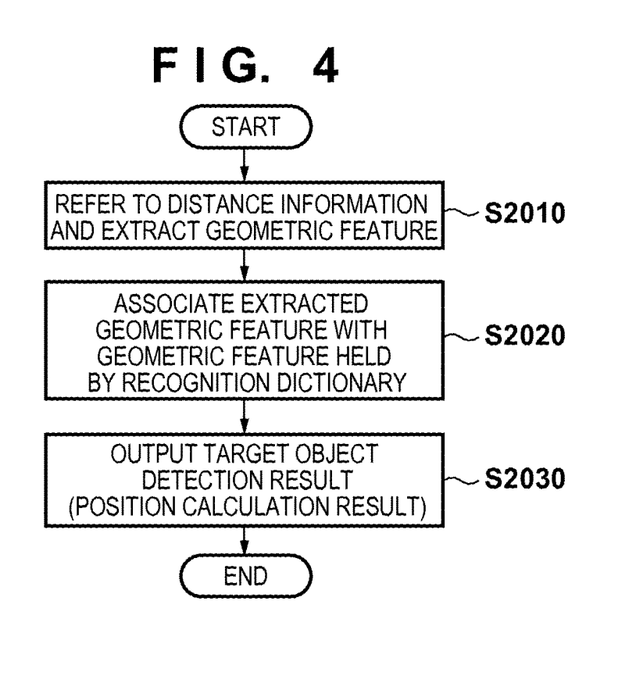
FIG. 4 is a flowchart showing collation processing according to the first embodiment.

The collation unit 120 calculates the relative coarse position and orientation using steps S2010 to S2030 of FIG. 4. More specifically, using geometric features calculated from the past distance information A as a dictionary, geometric features calculated from the current distance information B by referring to the measurement line map B are compared with the dictionary, and geometric features having similar feature amounts are associated with each other. The relative coarse position and orientation between the past distance information A and the current distance information B are calculated by minimizing an evaluation function based on the distance between corresponding geometric features. However, the method of calculating the coarse position and orientation of the target object, is not limited to this example. For example, the coarse position and orientation may be calculated by minimizing the distance between corresponding points based on the correspondence between the past distance information A and the current distance information B input by the user.

Next, based on the relative coarse position and orientation set in step S4010, the collation unit 120 associates a measurement point, of the current distance information B with a measurement point of the past distance information A overlapping the measurement area of the current distance information B (S4020). The collation unit. 120 projects the measurement points of the past distance information A on the measurement line map B, and associates a measurement point of the past distance information A and a measurement point referred to from the measurement line map B, whose projection position overlap.

In the third embodiment as well, the internal parameters (angle of view, resolution, focal length, and the like) of the projecting apparatus 10 and the image capturing apparatus 20 are known and acquired by the initialization processing (S200), as in the second embodiment. Then, the measurement points of the past distance information A are projected onto the measurement line map B using an ideal projection plane whose distortion is corrected in accordance with an optical model using the acquired internal parameters, and association is performed. When f1 and f2 indicate the focal lengths of the projecting apparatus 10 and the image capturing apparatus 20, respectively, perspective projection conversion from the three-dimensional coordinate values (x, y, z) of a measurement point of the past distance information A to coordinate values (u, v) on the measurement line map B is performed in accordance with equations (1), (2), and (3). In this way, the measurement points of the past distance information A are projected onto the measurement line map B, a measurement point corresponding to the projected coordinate values (u, v) is referred to from the measurement line map B, and the measurement point of the past distance information A and the measurement point referred to from the measurement line map B are associated.

The association method according to the third embodiment is not limited to the above-described example, and any method is applicable if it associates the current distance information B and the past distance information A by referring to the measurement line map B. For example, association may be done by searching for a measurement point of the past distance information A closest to a measurement point referred to from the measurement line map B.

Next, the collation unit 120 performs relative position and orientation calculation processing (S4030). The collation unit 120 minimizes the evaluation function based on the distance between the past distance information A and the current distance information B associated in step S4020. To apply the measurement points of the current distance information B to the past distance information A, the updating amount, of the position and orientation of the target, object is calculated and corrected by an iterative operation, thereby updating the position and orientation. For the iterative operation, a Gauss-Newton method is used as a nonlinear optimization method. However, as in the second embodiment, any other method is usable if it can calculate a position and orientation that minimize or maximize the evaluation function.

Next, the collation unit 120 determines convergence (S4040). If the updating amount of the position and orientation converges to a predetermined value, the collation processing ends. If the updating amount of the position and orientation does not converge, the processes of steps S4020 and S4040 are repeated. Note that the index used for convergence determination is not limited to the updating amount of the position and orientation, and it may be an evaluation value based on the distance between the past distance information A and the current distance information B, or the repetition count or elapsed time of processing.

Note that an example has been described above in which the measurement points of the measurement line map B and those of the past distance information A are aligned in a one-to-one correspondence. However, the alignment may be done by associating two or more measurement points of the past distance information A with one measurement point of the measurement line map B. In this case, the positions and orientations of a plurality of pieces of past distance information A overlapping the current distance information B are obtained. Relative positions and orientations between the pieces of past distance information A are also obtained. A position and orientation that minimize the distance between the distance information is calculated by bundle adjustment. Note that for details of bundle adjustment, see literature 13. The past distance information A may be acquired by executing step S210 a plurality of times or executing steps S210 and S220 a plurality of times.

Literature 13: Takayuki Okatani, "Bundle Adjustment", IPSJ Transactions on Computer Vision and Image Media, Vol. 2009-CVIM-167, No. 37, 2009

Note that an example in which the relative position and orientation of the target object are calculated by the iterative operation has been described above. However, the position and orientation may be calculated by a direct method. When a table or function of a distance field representing the distribution of distances from the past distance information A is created in advance, association in step S3020 can be omitted. More specifically, the distance from a three-dimensional point group, which is the current distance information B referred to from the measurement line map B, may be calculated by referring to a distance field table or using a distance field function, and the relative position and orientation of the target object may be calculated by minimizing an evaluation function based on the distance.

In the above-described way, alignment between a plurality of measurement data is performed using a measurement line map. As a result, when projecting one measurement data onto the other measurement data and performing association, projection onto an immeasurable area can be prevented using the measurement line map. It is therefore possible to prevent a failure of position and orientation calculation, a decrease in the position and orientation estimation accuracy, and an increase in the search time described in the second embodiment, and the measurement points can be associated efficiently and accurately.

Fourth Embodiment

The fourth embodiment of the present invention will be described below. The three-dimensional measurement apparatuses according to the first to third embodiments can be used to measure the three-dimensional shape of an object, as a matter of course, and also used for object recognition, self position estimation of a robot, estimation of the relative position and orientation between a robot and an object, and the like. In the fourth embodiment, an example will be described as a suitable application example of an information processing apparatus 12 described in the second embodiment in which a projecting apparatus 10 and an image capturing apparatus 20 are installed on the hand portion of a robot arm, and the position and orientation of a gripped object that is a measurement target object are measured.

Figure 6:
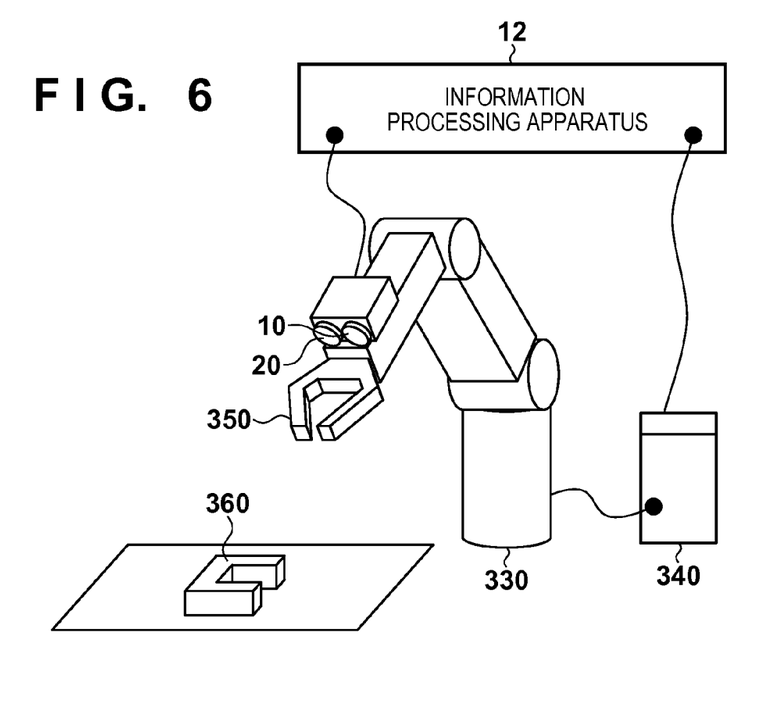
FIG. 6 is a view showing the arrangement of a robot arm according to the fourth embodiment.

FIG. 6 shows the arrangement of a robot arm system according to the fourth embodiment. A robot arm 330 is driven under the control of a robot controller 340 connected to the information processing apparatus 12. The projecting apparatus 10 and the image capturing apparatus 20 to be controlled by the information processing apparatus 12 are fixed to the robot arm 330 by a jig. That is, the information processing apparatus 12 controls grip of the robot arm 330.

The robot arm 330 performs an operation of picking a target object 360 by an arm grip portion 350. The information processing apparatus 12 creates a measurement line map by performing structured light projection and image capturing for measurement, and successively estimates the relative position and orientation between the arm grip portion. 350 and the target object 360 at a high speed while referring to the measurement line map. To transmit the position and orientation estimation result to the robot controller 340 as control parameters, the information processing apparatus 12 and the robot controller 340 are electrically connected via a cable. The target object 360 is picked, based on the detection result of the target object 360, that is, the estimated position and orientation.

Note that if coarse position and orientation are necessary for model fitting by a collation unit 120 of the information processing apparatus 12, a value obtained by adding an offset by the jig to a value representing the attachment position of the robot arm 330 controlled by the robot controller 340 is input to the information processing apparatus 12. In addition, a geometric model used in model fitting, the CAD model of the target object 360 is converted into a format processable by the information processing apparatus 12, and the data is input to the information processing apparatus 12. When the target object 360 is changed, the corresponding geometric model is changed each time, thereby coping with a plurality of types of objects. The geometric model can be changed by, for example, selecting one of geometric models held by the information processing apparatus 12 in advance or using the object detection method described in the first embodiment. The geometric model may be changed based on a part type recognition result from another part identification apparatus.

FIG. 6 illustrates an on-hand configuration that attaches the projecting apparatus 10 and the image capturing apparatus 20 to the robot arm 330. However, the projecting apparatus 10 and the image capturing apparatus 20 need not always be attached directly to the robot arm 330. For example, the projecting apparatus 10 and the image capturing apparatus 20 may be fixed in the environment so that an area where the target object 360 exists can be measured. Alternatively, the projecting apparatus 10 and the image capturing apparatus 20 may be attached to a measurement robot arm prepared independently of the robot arm 330 for gripping the target object 360.

In the above-described way, the information processing apparatus 12 can measure the position and orientation of the target object, at a high speed, and quick and robust target object, gripping or part assembly can be done by the robot arm.

Modification of Embodiments

The projecting apparatus 10 described in each embodiment need only project structured light. The projecting apparatus 10 can be a projector described in the first embodiment, or may combine a laser light source or a linear LED with a mirror and a lens, or sandwiches a slit-shaped slide between a light source and a lens. The image capturing apparatus 20 described in each embodiment need only be able to capture the reflected light of structured light and can therefore be a camera described in the first embodiment or a photodiode such as a PSD.

The acquisition unit 100 according to each embodiment need only acquire the reflected light of projected structured light. The acquisition unit 100 can use the projecting apparatus 10 and the image capturing apparatus 20, or may acquire captured data by reading out it from a storage device.

The measurement line map generation unit 110 according to each embodiment can use any distance information calculation method capable of linearly calculating distance information. An example is the distance measurement function described in the first embodiment. More specifically, a slit light projecting method may be used in which using slit light as linear structured light and a camera as the image capturing apparatus 20, distance information is calculated by capturing different slit, light components and a plurality of images corresponding to them. Alternatively, a space encoding method of projecting a plurality of gray code patterns, a grid pattern projecting method of projecting a grid pattern, a multi-slit light projecting method using an additional reference line pattern, or the like may be used.

The measurement line map generated by the measurement line map generation unit 110 according to each embodiment need only hold distance information or reference information thereof in a two-dimensional map having a dimension corresponding to the number of measurement lines and a dimension corresponding to the number of pixels of an image formed by receiving the measurement lines. An example is the measurement line map described in the first embodiment. More specifically, in the two-dimensional coordinate space of the projection plane of the projecting apparatus 10, the three-dimensional coordinate values of measurement, points are stored as distance information in a map of a two-dimensional array formed by dividing one dimension in accordance with the number of measurement lines and the other dimension in accordance with the number of pixels of the image capturing apparatus 20, thereby generating a measurement line map. Any elements can be stored in the two-dimensional map as long as they can refer to information about, distances from the two-dimensional map. The elements can be the three-dimensional coordinate values of measurement points as in the first embodiment, or may be a distance value from the projecting apparatus 10 or the image capturing apparatus 20, or a pointer to distance information. Additional information such as the measurement reliability of each measurement point may be included as well as the information about the distance. The size of the two-dimensional array is not limited to (number of measurement lines)×(number of pixels of image capturing apparatus 20 in measurement line direction) and may correspond to a partial area thereof.

The collation unit 120 according to each embodiment need only collate distance information referred to from the measurement line map with the shape information of a target object. An example is the target object detection method described in the first embodiment. Alternatively, a target object position and orientation calculation method described in the second embodiment or the measurement data aligning method described in the third embodiment is applicable, as a matter of course.

In the first to fourth embodiments, an input image at the time of run time processing can be used as a pre-acquired image. This makes it possible to generate an appropriate learning image dynamically for an environmental change in run time processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-076449 filed Apr. 1, 2013 which is hereby incorporated by reference herein in its entirety.

What is claimed is:

1. An information processing apparatus comprising:
an acquisition unit configured to acquire an image representing reflected light of structured light; and
a generation unit configured to calculate distance information from the image and generate a measurement line map storing the distance information,
wherein the structured light forms a plurality of measurement lines at discrete positions, and the measurement line map is formed as a two-dimensional array in which one dimension includes elements in a number being determined depending on a number of the measurement lines, and another dimension includes elements in a number corresponding to a number of pixels of the image in a lengthwise direction of the measurement lines, and
wherein at least one of the acquisition unit or the generation unit is implemented by using a processor.

2. The apparatus according to claim 1, wherein the acquisition unit acquires the image by controlling a projecting apparatus configured to project the structured light and an image capturing apparatus configured to receive the reflected light.

3. The apparatus according to claim 2, wherein the plurality of measurement lines are substantially perpendicular to a line connecting the projecting apparatus and the image capturing apparatus.

4. The apparatus according to claim 1, wherein the distance information is information representing three-dimensional coordinate values of a measurement point.

5. The apparatus according to claim 1, further comprising a collation unit configured to collate the distance information stored in the measurement line map with shape information representing a three-dimensional shape of a detection target object so as to derive the object existing in a capturing range of the image.

6. The apparatus according to claim 5, wherein the collation unit comprises a preparation unit configured to prepare the shape information as a recognition dictionary.

7. The apparatus according to claim 5, wherein the collation unit comprises:
an extraction unit configured to extract a geometric feature from the distance information stored in the measurement line map; and
an association unit configured to associate the extracted geometric feature with a geometric feature represented by the shape information so as to derive the object.

8. The apparatus according to claim 7, wherein the extraction unit searches for an observation point in neighborhood of an observation point of interest by referring to the measurement line map and extracts the geometric feature from a positional relationship between the observation points.

9. The apparatus according to claim 5, wherein the collation unit comprises:
an obtaining unit configured to obtain a coarse position and orientation of the object; and
an association unit configured to project a geometric feature of the shape information of the object observable in the coarse position and orientation onto the measurement line map and associate the geometric feature with a measurement point referred to from the measurement line map so as to derive the position and orientation of the object.

10. The apparatus according to claim 9, wherein the acquisition unit acquires the image by controlling a projecting apparatus configured to project the structured light and an image capturing apparatus configured to receive the reflected light, and
the association unit performs the projection by perspective projection conversion based on internal parameters of the projecting apparatus and the image capturing apparatus.

11. The apparatus according to claim 5, wherein the collation unit comprises:
an obtaining unit configured to obtain past distance information obtained by measuring the object in the past;
a setting unit configured to set a relative coarse position and orientation of the distance information based on a first measurement line map generated from the past distance information by the generation unit and a second measurement line map generated from the image by the generation unit; and
an association unit configured to associate a measurement point of the distance information stored in the second measurement line map with a measurement point of the distance information stored in the first measurement line map based on the relative coarse position and orientation so as to derive a relative position and orientation of the object.

12. The apparatus according to claim 5, further comprising a control unit configured to control, based on a result of the collation unit, a grip unit configured to grip the object.

13. The apparatus according to claim 5, wherein the shape information comprises a CAD model, and the collation unit derives a position and orientation of the object by model fitting using the geometric model.

14. The apparatus according to claim 9, wherein the association unit corrects the coarse position and orientation of the object such that a distance between the geometric feature of the shape information of the object and the associated measurement point is shortened so as to calculate the position and orientation of the object.

15. An information processing method comprising:
using a processor to perform the steps of:

acquiring an image representing reflected light of structured light;

calculating distance information from the image; and generating a measurement line map storing the distance information, wherein the structured light forms a plurality of measurement lines at discrete positions, and the measurement line map is formed as a two-dimensional array in which one dimension includes elements in a number being determined depending on a number of the measurement lines, and another dimension includes elements in a number corresponding to a number of pixels of the image in a lengthwise direction of the measurement lines.

16. A non-transitory computer readable medium storing a computer-executable program for causing a computer to perform an information processing method, wherein said method comprises:

using a processor to perform the steps of:

acquiring an image representing reflected light of structured light;

calculating distance information from the image; and generating a measurement line map storing the distance information, wherein the structured light forms a plurality of measurement lines at discrete positions, and the measurement line map is formed as a two-dimensional array in which one dimension includes elements in a number being determined depending on to a number of the measurement lines, and another dimension includes elements in a number corresponding to a number of pixels of the image in a lengthwise direction of the measurement lines.

* * * * *